E. D. CHAPLIN.
ART OF PRODUCING LEAD SALTS BY ELECTROLYSIS.
APPLICATION FILED FEB. 3, 1906.
906,103.
Patented Dec. 8, 1908.
2 SHEETS—SHEET 1.
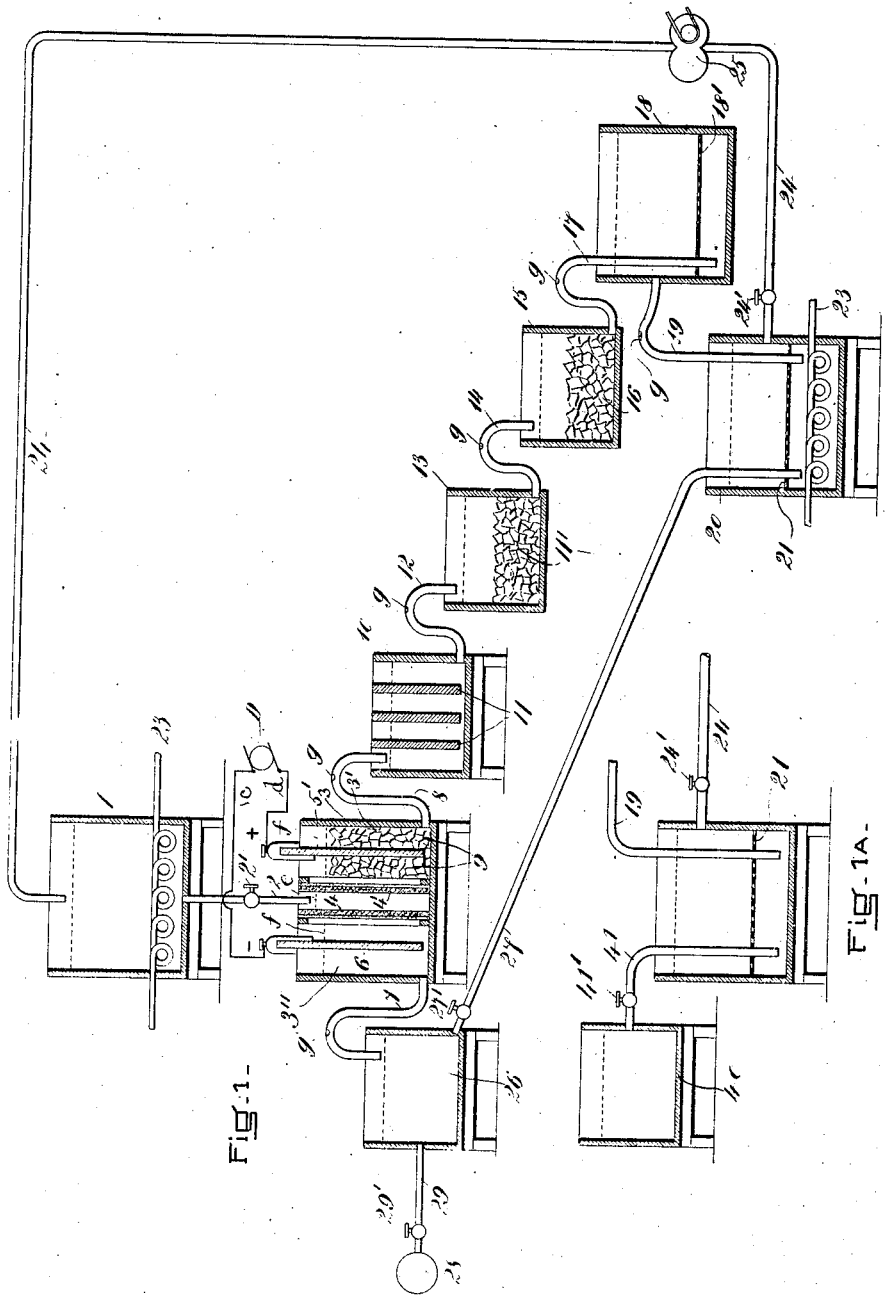
WITNESSES
E. B. Tomlinson.
S. A. Higgins.
INVENTOR
Edwin D. Chaplin
by Browne & Woodworth
his attorneys.

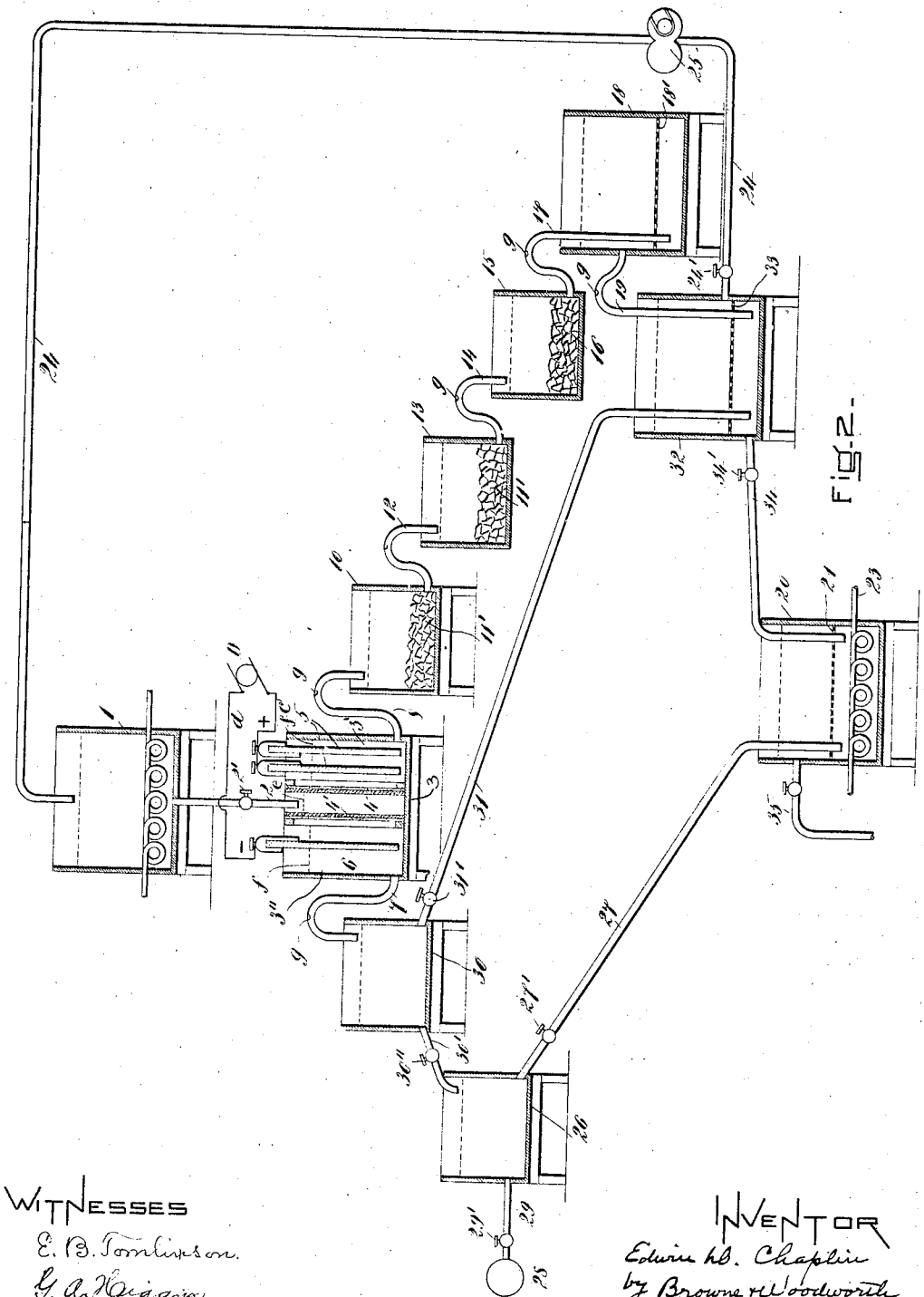

UNITED STATES PATENT OFFICE.

EDWIN D. CHAPLIN, OF BOSTON, MASSACHUSETTS, ASSIGNOR TO INTERNATIONAL LEAD COMPANIES, A VOLUNTARY ASSOCIATION.

ART OF PRODUCING LEAD SALTS BY ELECTROLYSIS.

No. 906,103.　　　　　Specification of Letters Patent.　　　Patented Dec. 8, 1908.

Application filed February 3, 1906. Serial No. 299,239.

*To all whom it may concern:*

Be it known that I, EDWIN D. CHAPLIN, a citizen of the United States, and a resident of Boston, in the county of Suffolk and State of Massachusetts, have invented a new and useful Improvement in the Art of Producing Lead Salts by Electrolysis, of which the following is a specification.

My invention relates to the art of producing pigments by electrolysis, and it relates more particularly to a process for so producing those pigments consisting of lead salts, such as lead carbonate, lead chromate, etc., from crude lead bullion or lead ore, carrying any impurity in any proportion, or carrying any metals such as gold, silver, copper, etc., and recovering said metals.

According to the present invention such crude bullion cast in the form of ingots, pigs, plates, and other convenient forms, is employed as the anode of an electrolyzer containing preferably an electrolyte which under the influence of the electric current will separate into a solvent of lead and an alkaline hydrate. By electrolytic action, a solution containing soluble salts of lead and such other metals as may be contained in the bullion or ore, and which are soluble in said solvent, is produced; by contact deposition or by any suitable method, said other metals are recovered from said solution; and the remaining solution of a soluble salt of lead is converted into the desired salt of lead. While any suitable method may be employed to prevent the formation in the electrolyzer of insoluble basic salts of lead, which is prejudicial to commercial working, I prefer in general the method disclosed in Letters Patent No. 675,555 granted to H. G. Halloran and myself, by which is produced a solution of a soluble acid salt of lead; and said solution may be converted into the desired lead salt,— lead carbonate or lead chromate,—in any suitable manner.

My invention may best be understood by having reference to the drawings which accompany and form a part of this specification, and which illustrate in diagrammatic form several arrangements of apparatus and circuits whereby my process may be carried into effect; but it is to be understood that my invention is broader than mere apparatus and may be carried into effect by a variety of apparatus and circuit arrangements.

In the drawings, Figure 1 represents an apparatus for carrying out my process in which lead carbonate may be produced by directly carbonating a lead solution; Fig. 1ª is fragmentary view of a modification of the apparatus shown in Fig. 1, and represents an apparatus whereby a lead solution may be converted into lead chromate; and Fig. 2 represents an apparatus for carrying out my process in which lead carbonate may be produced from a lead solution indirectly by first precipitating lead hydrate therefrom and then carbonating said hydrate.

In the figures, 1 represents a supply tank containing any suitable electrolyte which under the action of the electric current will produce in the anode compartment of an electrolytic cell a solvent of lead and such other metals as usually are present in crude lead bullion or ore, and in the cathode compartment an alkaline hydrate. The electrolyte may contain an oxidizing agent or a soluble salt of such character as to prevent the formation of insoluble lead salts in the electrolyzer.

While a great variety of solutions may be employed as electrolytes in the process herein described, I prefer to employ an aqueous solution of a non-alkaline salt, such as a nitrate or an acetate of an alkaline base, for example, sodium nitrate, and as the salt to be mixed with said electrolyte to prevent the formation of insoluble salts of lead, I prefer to employ chlorid or chlorate of an alkaline base, for example, sodium chlorid or sodium chlorate. Although the formation of insoluble basic salts of lead may most effectively be prevented by employing such soluble chlorid or chlorate salt and thereby obtaining a soluble acid salt of lead, I do not limit myself to this method but may employ the method set forth in Letters Patent Nos. 555,232; 563,553, granted to A. B. Browne and myself, and 563,555, granted to A. B. Browne.

I shall hereinafter refer to the solution in tank 1 as the "neutral solution" and shall assume that it contains sodium nitrate and sodium chlorid.

While any suitable form of cell or electrolyzer may be employed, I find an electrolyzer of the general type shown at 3 in Figs. 1 and 2, to be convenient for carrying out the herein described process.

The electrolyzer 3 is divided into an anode compartment 3′ and a cathode compartment 3″, by means of the foraminous diaphragms 4 4′, between which is formed a compartment for receiving the electrolyte from the tank 1 through the pipe 2, which is provided with a valve 2′. For the purpose of preventing a mixture of the anolyte and catholyte in the electrolyzer and consequently a precipitation of lead hydrate in the electrolyzer, I may maintain a preponderance of pressure on the inner sides of said diaphragms, preferably by maintaining the level of the electrolyte between the diaphragms higher than the level of the anolyte and catholyte. The level of the electrolyte in the compartment between the diaphragms is indicated by the dotted line $e$, and the level of the anolyte and catholyte, which is governed by the height of the bends of the outlet pipes 7 and 8, is indicated by the dotted lines $f$. In order to prevent said outlet pipes from siphoning the liquids out of the electrolyzer, the upper portion of each of said bends may be provided with an opening $g$ to equalize the atmospheric pressure on the columns of liquid in the two portions of each of said pipes.

The crude bullion or lead ore may be placed in the anode compartment 3′ and a cathode of copper, lead or other suitable material, is placed in the cathode compartment 3″. The crude bullion may be cast into ingots, pigs, or other suitable forms, and employed as the anodes, as shown in Fig. 2 at 5, 5; or, if lead ore, which may be wholly or partially smelted, or which may be untreated ore, is employed, it may be packed around a plate or other member of carbon, pig lead, or lead bullion 5′, as shown in Fig. 1 at 9. While any suitable lead ore may be employed in the present process, galena will probably give the best results in the shape of by-products, for galena, which consists chiefly of lead sulfid, is generally rich in silver and copper, and contains usually a certain quantity of gold, all of which metals may be recovered in a metallic form as hereinafter more fully set forth.

When the electrolyzer is charged with the neutral solution and the current from the dynamo D is passed therethrough by the conductors $c$ and $d$, which are connected respectively to the anodes 5, 5′ and the cathode 6, a mixed solution of soluble acid salts of lead, silver, copper, etc., is formed in the anode compartment 3′, if, as is assumed, galena is employed as the ore to be treated; and an alkaline hydrate, which in the present assumed case, is sodium hydrate, is formed in the cathode compartment 3″. The mixed solution in the anode compartment is drawn off by the pipe 8 and discharged into the tank 10 which contains metallic copper shown in Fig. 1 as copper bars, pigs or ingots 11, and in Fig. 2 as scrap copper 11′, although copper in any suitable form may be employed, and by the reaction between said metallic copper and the soluble silver salt contained in said mixed solution, metallic silver is removed from said solution and deposited on the copper, while the soluble copper salt is added to said mixed solution. The mixed solution may be drawn off from the tank 10 by the pipe 12, and discharged into a second tank 13, containing metallic copper in any suitable form, herein shown as scrap copper 11′, so as more thoroughly to remove the silver from the mixed solution. The solution may then be discharged from tank 13 by the pipe 14, into the tank 15, containing metallic lead 16 in any suitable form. By the reaction between said metallic lead and the soluble copper salt contained in the solution, metallic copper is removed from said solution and deposited on the lead while a soluble lead salt is added to the mixed solution.

While I have specifically mentioned metallic copper as suitable for removing the silver from the solution by contact deposition, and metallic lead as suitable for so removing the copper therefrom, it is to be understood that I do not limit myself to the employment of such metals inasmuch as other metals are suitable for these purposes; nor do I desire to be limited solely to the method of contact deposition for recovering the valuable metals from the mixed solution, or for removing objectionable ones therefrom, inasmuch as I consider any suitable method to be within the scope of my invention. For example, if lead and silver nitrate were formed by employing a nitrate salt as the electrolyte, a zinc salt, such as zinc chlorid might be used which would precipitate the silver by double decomposition of itself and the silver nitrate, the precipitant becoming zinc nitrate and remaining in solution with the lead nitrate. The mixed solution might then be treated in a separate tank with sodium hydrate in excess, thereby precipitating the zinc as zinc hydrate and precipitating and redissolving the lead. The resulting alkaline solution of lead might then be treated with carbon dioxid, thereby precipitating lead carbonate.

If other metals beside silver and copper are present in the ore or bullion, and soluble salts thereof are present in the mixed solution, any method similar to that above set forth, or any other suitable method, may be employed at any stage in the process for their removal; and after all have been removed or recovered, the solution, then containing only soluble salts of lead, may be converted into lead carbonate, lead chromate, or other desired lead salt in any suitable manner.

By way of example, in the process which may be carried out by the apparatus shown in Fig. 1, the solution of a soluble salt, or salts of lead, may be drawn off from tank 15 by the pipe 17, and discharged into the lower portion of the tank 18, containing the filter 18'. The filtrate may be discharged from the upper portion of said tank into the lower portion of the precipitating tank 20, where it may be converted into lead carbonate by treating it with a carbonate of an alkaline base. If desired, the tank 18 may be omitted and the solution discharged directly from tank 15 into the precipitating tank, and in lieu of the particular form of precipitating tank shown any other suitable type of precipitating tank may be employed. As indicated in Fig. 1ª, the lead solution in tank 20 may be treated with a chromate or bi-chromate of an alkaline base, or with a mixture of the two, in order to precipitate lead chromate therefrom. In Fig. 1ª, the lead chromate is contained in the tank 40 and is discharged into the precipitating tank by the pipe 41, which is provided with the valve 41'.

In Fig. 1, the alkaline hydrate formed in the cathode compartment 3'' is drawn off by the pipe 7 and discharged into the tank 26 where it is treated with carbon-dioxid produced in the generator 28, which is connected with tank 26 by the pipe 29 provided with the valve 29'. The alkaline carbonate so formed,—sodium carbonate in the present assumed case,—may be discharged by the pipe 27 provided with the valve 27', into the precipitating tank 20 below the filter 21, thereby converting the soluble acid salt of lead into lead carbonate which may be removed in any suitable manner and run through a filter press, or otherwise prepared for use. The filtrate which is substantially the original neutral solution may be drawn from the tank 20, through the pipe 24, which enters said tank above the filter and conveyed to tank 1 by the pump 25. Steam coils 23 may be provided for tank 1 and, if necessary, for tank 20 or other suitable means may be employed for maintaining the solutions at the desired temperature. It is desirable to maintain the original neutral solution at such temperature as to render soluble the lead chlorid which is formed in the earlier stages of the process if a soluble chlorid salt is employed in said solution, and it is desirable to maintain the lead solution in the precipitating tank at such temperature as will permit the precipitation therefrom of hydrated lead carbonate, if the soluble lead salt is to be converted into white lead.

While the direct process of making white lead above described, results in a product which for some purposes is preferred to that produced by the indirect process of precipitating lead hydrate from the soluble acid salt of lead, and then carbonating said lead hydrate, the latter process results in a product which has superior color-carrying and covering properties. An apparatus whereby such indirect process may be carried out according to my present invention is shown in Fig. 2, in which the reference characters have the same significance as in Fig. 1. According to the indirect process the alkaline hydrate formed in the cathode compartment 3'' is discharged by pipe 7 into the tank 30, and a portion of said hydrate is conveyed by the pipe 31, provided with the valve 31' into the precipitating tank 32, and mixed with the lead solution which by the pipe 19 is discharged into said tank from the filtering tank 18. The lead hydrate formed in tank 32 may be discharged by pipe 34, provided with the valve 34' into the precipitating tank 20, while the filtrate which is substantially the original neutral solution, may be pumped from the upper portion of the tank 32 to the supply tank 1.

The rest of the alkaline hydrate in the tank 30 is discharged into the tank 26, through the pipe 30', provided with a valve 30'' and converted into a bicarbonate of an alkaline base,—sodium bicarbonate in the present assumed case,—by treating it with carbon-dioxid from the generator 28. Said sodium bicarbonate is discharged by pipe 27, provided with the valve 27', into the precipitating tank 20, where it converts the lead hydrate discharged therein by pipe 34, into lead carbonate, while the alkaline hydrate produced thereby passes through the filter 21 and is discharged by the pipe 35.

If gold or other metals which are insoluble by electrolytic action in the neutral solution employed are present in the bullion or ore, they will be thrown down in the anode compartment and may be recovered from the slimes in the bottom thereof.

By the process above described, lead ore which is practically valueless for smelting and reduction in the ordinary manner, may be profitably employed for producing marketable lead salts; and any valuable metals that may be contained in such ore in quantities too small to pay for their recovery by ordinary methods, may be recovered as by-products.

The process is continuous and in addition to the carbon-dioxid, or chromate solutions, employed, and the lead ore consumed, requires only the addition from time to time of fresh quantities of the neutral solution and the removal from the anode compartment of the gangue or other insoluble matter.

It will be understood that I do not limit myself in the present invention to any particular process of producing a lead or other pigment, or to any particular apparatus whereby the hereindescribed process may be effected, inasmuch as I consider any such process within the scope of my invention and inasmuch as many different types of apparatus may be employed for carrying out my invention.

As applied to the process herein, the word

"continuous" does not mean that at every instant there must necessarily be a flow of the solution. The term as used herein is satisfied if the solution is supplied as required for use in the different steps without necessitating the interruption of the supply in one step by the performance of a subsequent step. Thus, the supply of electrolyte to the electrolyzer might temporarily be shut off and the solution in the electrolyzer drawn down to some extent, the supply of the electrolyzer being again started and the electrolyzer replenished, this being within the term "continuously" as applied to the supply of electrolyte to the electrolyzer. The term is used to distinguish the present process from those processes in which there is necessarily an interruption in the performance of one step by the performance of a subsequent step. Thus where the solution produced in the electrolyzer by the electrolysis is subsequently treated in the electrolyzer, as by the substituting electrodes, it will be obvious that the supply of electrolyte to the electrolyzer must be cut off and suspended during this subsequent step. The supply of electrolyte to the electrolyzer under these circumstances would not be "continuous" within the meaning of the term as used herein.

I claim:

1. The process herein described of producing lead salts from lead ore or bullion, which consists in continuously supplying an electrolyte to an electrolyzer containing lead ore or bullion as an anode, forming by electrolysis from such lead ore or bullion a solution of a soluble salt of lead, continuously withdrawing said solution from the electrolyzer and recovering therefrom in metallic form such metals other than lead as may be in said solution, and treating the resulting solution with a precipitating agent thereby converting said soluble salt of lead into the desired salt of lead.

2. The process herein described of producing white lead from lead ore or bullion which consists in continuously supplying an electrolyte to an electrolyzer containing lead ore or bullion as an anode, forming from such lead ore or bullion a solution of a soluble salt of lead, continuously withdrawing said solution from the electrolyzer and recovering therefrom in metallic form such metals other than lead as may be in said solution, and treating the resulting solution with a precipitating agent whereby the soluble salt of lead is converted into lead carbonate.

3. The process herein described of producing lead salts from lead ore or bullion which consists in continuously supplying an electrolyte to an electrolyzer containing lead ore or bullion as an anode, forming by electrolysis from such lead ore or bullion a solution of a soluble salt of lead in the presence of a soluble salt of such character as to prevent the formation of insoluble lead salts in the electrolyzer, continuously withdrawing said solution from the electrolyzer and recovering therefrom in metallic form such metals other than lead as may be in said solution, and treating the resulting solution with a precipitating agent whereby the soluble salt of lead is converted into the desired salt of lead.

4. The process herein described of producing white lead from lead ore or bullion which consists in continuously supplying an electrolyte to an electrolyzer containing lead ore or bullion as an anode, forming by electrolysis from such ore or bullion a solution of a soluble salt of lead in the presence of an oxidizing agent to prevent the formation of insoluble lead salts in the electrolyzer, continuously withdrawing said solution and recovering therefrom in metallic form such metals other than lead as may be in said solution, and treating the resulting solution with a precipitating agent thereby converting said soluble salt of lead into lead carbonate.

5. The process herein described of producing lead salts from ore or bullion containing lead and other metals and recovering said other metals, which consists in electrolytically forming from such ore or bullion as an anode a solution containing soluble salts of lead and other metals, recovering by contact deposition said other metals, and converting said soluble salt of lead into the desired salt of lead.

6. The process herein described of producing lead salts from ore or bullion containing lead silver and copper and recovering said silver and copper, which consists in electrolytically forming from such ore or bullion as an anode a solution containing soluble salts of lead silver and copper, passing said solution through a vessel containing metallic copper to recover in metallic form by contact deposition such silver as may be contained in the solution, passing the solution through another vessel containing metallic lead to recover in metallic form by contact deposition such copper as may be contained in the solution, and then passing the remaining solution into another vessel and therein converting the soluble lead salt into the desired salt of lead.

7. The process herein described of producing lead salts from ore or bullion containing lead and another metals and recovering said other metals, which consists in electrolytically forming from such ore or bullion as an anode a solution containing soluble salts of lead and other metals, passing said solution successively through vessels containing different metals, respectively, to recover in metallic form by contact deposition said other metals and then converting the soluble salt of lead into the desired salt of lead.

8. The process herein described of producing lead salts from ore or bullion containing lead and another metal and recovering said other metal, which consists in electrolytically forming from such ore or bullion as an anode a solution containing soluble salts of lead and said other metal, passing said solution through a vessel or vessels containing metal to recover by contact deposition said other metal and then converting said soluble salt of lead into the desired salt of lead.

9. The process herein described of producing lead salts from lead ore or bullion, which consists in continuously supplying an electrolyte to an electrolyzer containing lead ore or bullion, forming by electrolysis from said ore or bullion a solution of a soluble acid salt of lead, continuously withdrawing said solution from the electrolyzer and recovering therefrom in metallic form such metals other than lead which may be in said solution, and treating the resulting solution with a precipitating agent whereby said soluble acid salt of lead is converted into another salt of lead.

10. The process herein described of producing lead salts from lead ore or bullion, which consists in continuously supplying an electrolyte to an electrolyzer containing lead ore or bullion, forming by electrolysis from such lead ore or bullion a solution of a soluble acid salt of lead, continuously withdrawing said solution from the electrolyzer and recovering therefrom in metallic form such metals other than lead as may be in said solution, and treating the resulting solution with a precipitating agent thereby converting said soluble salt of lead into lead carbonate.

11. The process herein described of producing lead salts from lead ore or bullion, which consists in continuously supplying an electrolyte to an electrolyzer containing lead ore or bullion, forming by electrolysis from such lead ore or bullion a solution of a soluble acid salt of lead in the presence of a soluble salt of such character as to prevent the formation of insoluble lead salts in the electrolyzer, continuously withdrawing said solution from the electrolyzer and recovering therefrom in metallic form such metals other than lead as may be in said solution, and treating the resulting solution with a precipitating agent thereby converting said soluble salt of lead into lead carbonate.

12. The process herein described of producing lead salts from ore or bullion containing lead, silver and copper and recovering said silver and copper, which consists in electrolytically forming from said ore or bullion a solution containing soluble salts of lead, silver and copper, passing said solution through a vessel containing metallic copper to recover in metallic form by contact deposition such silver as may be contained in the solution, passing the solution through another vessel containing metallic lead to recover in metallic form by contact deposition such copper as may be contained in the solution, and then converting the soluble lead salt into another salt of lead.

13. The process herein described of producing lead salts from ore or bullion containing lead and other metals and recovering said other metals, which consists in electrolytically forming from such ore or bullion a solution containing soluble acid salts of lead and other metals, passing said solution successively through vessels containing different metals, respectively, to recover in metallic form by contact deposition said other metals and then converting the said soluble acid salt of lead into lead carbonate.

14. The process herein described of producing lead salts from ore or bullion containing lead and another metal and recovering said other metal, which consists in electrolytically forming from said ore or bullion a solution containing soluble acid salts of lead and said other metal, passing said solution through a vessel or vessels containing metal to recover by contact deposition said other metal and then converting said soluble salt of lead into lead carbonate.

15. The process herein described of producing lead salts from lead ore or bullion by electrolysis, which consists in electrolytically forming from lead ore or bullion as an anode a solution of a soluble salt of lead, withdrawing said solution from the electrolyzer, recovering in metallic form such metals other than lead as may be in said solution, treating the resulting solution with a precipitating agent, thereby converting said soluble salt of lead into the desired salt of lead and regenerating the solution, and passing the regenerated solution into the electrolyzer.

16. The process herein described of producing white lead from lead ore or bullion by electrolysis, which consists in electrolytically forming from lead ore or bullion as an anode a solution of a soluble salt of lead in the presence of an oxidizing agent to prevent the formation of insoluble lead salts in the electrolyzer, recovering in metallic form such metals other than lead as may be in said solution, treating the resulting solution with a precipitating agent thereby converting said soluble salt of lead into lead carbonate and regenerating the solution, and passing the regenerated solution into the electrolyzer.

17. The process herein described of producing lead salt from lead ore or bullion by electrolysis, which consists in electrolytically forming from lead ore or bullion a solution of a soluble acid salt of lead in the presence of a soluble salt of such character as to prevent the formation of insoluble lead salts in the electrolyzer, withdrawing said solution from the electrolyzer, recovering in metallic form such metals other than lead as may be in said solution, treating the resulting solution with a precipitating agent thereby converting said soluble salt of lead into lead carbonate and regenerating the solution, and passing the regenerated solution into the electrolyzer.

In testimony whereof, I have hereunto subscribed my name this 5th day of Jan. 1906.

EDWIN D. CHAPLIN.

Witnesses:
  CHARLES C. KURTZ,
  GEO. K. WOODWORTH.